April 14, 1964     W. M. GAITTEN     3,128,872
UNLOADERS FOR LUMBER MILLS

Filed Nov. 2, 1960     2 Sheets-Sheet 1

INVENTOR
WALDEN M. GAITTEN

ATTORNEYS

April 14, 1964 W. M. GAITTEN 3,128,872
UNLOADERS FOR LUMBER MILLS
Filed Nov. 2, 1960 2 Sheets-Sheet 2

INVENTOR
WALDEN M. GAITTEN

BY
ATTORNEYS 3,128,872
UNLOADERS FOR LUMBER MILLS
Walden M. Gaitten, Sylacauga, Ala., assignor to Soderhamn Machine Manufacturing Co., Talladega, Ala.
Filed Nov. 2, 1960, Ser. No. 66,822
3 Claims. (Cl. 198—188)

This invention relates to unloaders or deflectors for conveyors, especially those which handle elongated objects such as boards, or the like, in lumber mills.

Deflector plates are known that may be set at an angle to a conveyor on which elongated articles are being fed so that when the leading end of the elongated article strikes the deflector plate such leading end will be deflected to one side beyond an edge of the conveyor and, when the elongated article has moved sufficiently far the center of gravity of the elongated article will move to beyond the edge of the conveyor and the article will fall off the conveyor.

While this known deflector device operates to get the articles off of the conveyor, successive articles, especially if they vary in weight or in length, will not fall in a uniform pattern from the conveyor and will not fall to lie generally parallel to the conveyor.

It is a principal object of the present invention to provide deflecting means for use with a conveyor for elongated articles that will remove said articles from the conveyor accurately and positively so that irrespective of the lengths of such articles they will be removed so that their leading ends will be uniformly placed on a pile, or on a further conveyor.

It is a further object of the invention to provide a deflecting means to remove elongated articles from a conveyor that will deliver such articles to lie generally parallel to the axis of the conveyor from which they are deflected.

Other and further objects and advantages will appear from the following specification taken in connection with the accompanying drawings in which like characters of reference denote similar parts in the several views and in which.

Figure 1:
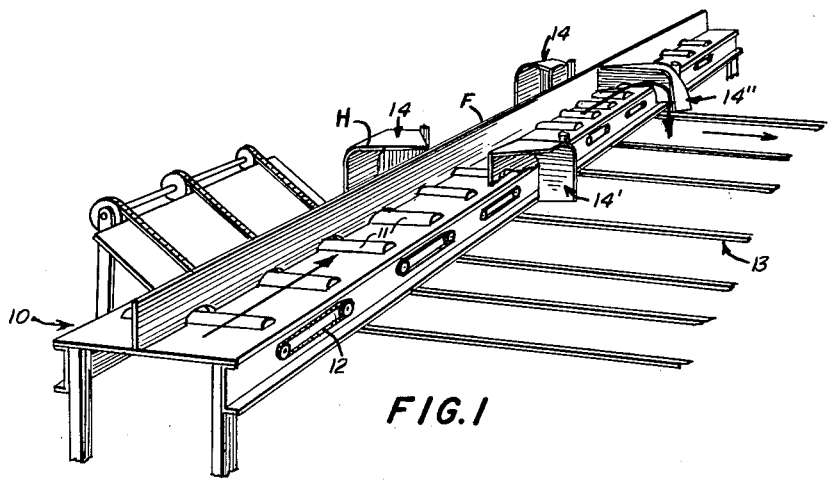
FIGURE 1 is a perspective view from the infeed side of a roller conveyor with which the deflector of the present invention is used showing several of the deflectors.

Sawn lumber in a lumber mill or other elongated objects are often conveyed on conveyors which include a plurality of rollers over which boards or like objects travel endwise.

Deflectors are known that may be placed across the path of the lumber to force the end of each successive piece of lumber to move to one side so that such end will extend beyond the edge of a supporting conveyor. As the piece of lumber, such as a board, continues its forward motion the leading end is forced further and further to one side until finally the center of gravity of the board is beyond an edge of the conveyor and the board falls off the conveyor. A long board will not be overbalanced until its leading end is far beyond where the leading end of a shorter board will be when it overbalances. A shorter board will fall to be at an angle to the conveyor rather than parallel to it. A long board will fall to be at a lesser angle but still not parallel to the conveyor.

The present invention has been developed to overcome these and other objections to the known devices.

Referring to the drawings, a conveyor 10 is provided with a plurality of rollers 11. Rollers 11 may be driven by chains 12 or may be merely idler rollers that permit movement of the lumber along the conveyor by gravity or inertia.

Below the conveyor 10 is a cross conveyor 13 which may be of any suitable type and onto which it may be desired to place some, or all of the lumber proceeding along conveyor 10 so as to deliver it to a desired destination to one side of conveyor 10. There may be one or more stations along conveyor 10 at which it will be desirable to transfer lumber to a cross conveyor such as at 13.

At each station is a deflector designated generally as 14. The conveyor shown has two portions separated by a fence F making, in fact, a conveyor on each side of the fence so that the deflectors are on the right and left hand sides as viewed in FIGURES 1, 2 and 3.

In FIGURE 1 a log, cant, board, or piece of dimensioned stock travelling along the near side of conveyor 10 will pass deflector 14' and proceed to deflector 14" which is in deflecting position. The material travelling along the far side will be deflected by deflector 14. It will be seen, therefore, that the material on the two sides of the conveyor may be deposited selectively at different stations along conveyor 10.

The deflector 14 can best be described with reference to FIGURE 4 where it is seen that an item to be transferred from conveyor 10 will be proceeding endwise in the direction of the arrow along conveyor 10 while supported by the rollers 11.

Figure 4:
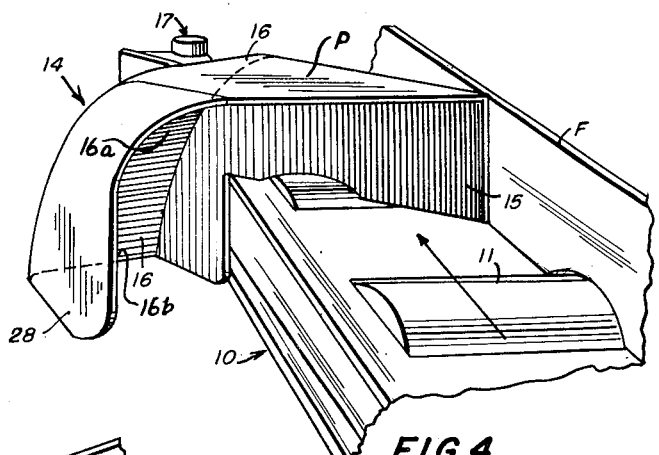
FIGURE 4 is a perspective view of the deflector seen at the left in FIGURE 3.

When an item such as a board arrives at the deflecting station where deflector 14 is in position to deflect the board, the leading end of the board to be transferred will strike deflector plate 15 which is disposed at an acute angle to the direction of travel of the board, and will be deflected to the side of and slightly beyond the edge of the conveyor 10 so the board will still extend along the conveyor but at an angle to it, see FIGURE 4. The end of the board will then strike plate 16 and be deflected downwardly. Since the board continues to move forwardly either by inertia or by the traction of rollers 11 the end is pushed down curved surface 16a of plate 16. The remainder of the board is then brought into contact with the marginal edge of conveyor 10, which is purposely made smooth, so that the board, slowed down by the fact that plate 16 is substantially vertical at its lower end, as at 16b, will slide down over the edge of conveyor 10 onto the cross conveyor 13.

While cross conveyors are shown it is clear that the board, or other items, could be equally well deflected into a receiving bin, or water, or to any other desired destination.

Deflector 14 is mounted on a vertical pivot at 17 at the edge of conveyor 10. This pivot is shown as comprising a vertical pipe 18 rigidly secured to the edge of the conveyor bed, and a hinge pin 19 mounted in clamps 20 and 21 secured to plate 15.

Deflector 14 may be pivoted about pivot 17 by a hydraulic cylinder-and-piston device 22, 23 secured at one end to a bracket 24 on the conveyor and at the other end to a lug 25 on plate 16. The hydraulic control for means 22, 23 may be located at any convenient place.

Figure 2:
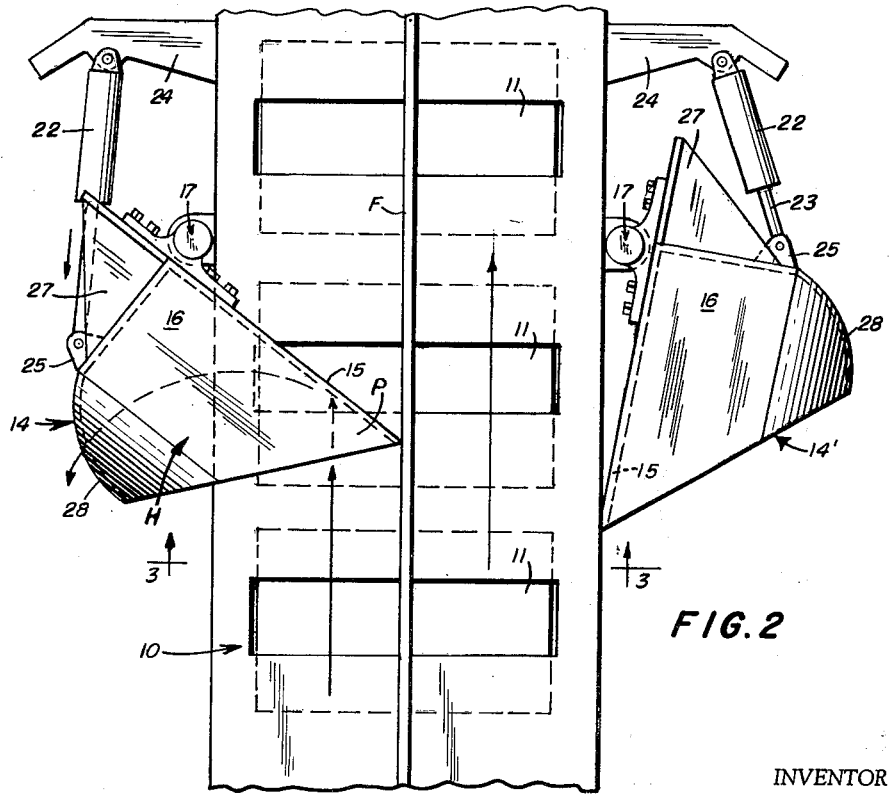
FIGURE 2 is a fragmentary plan view of a conveyor similar to FIGURE 1 and illustrating a deflector station with one deflector in operative position and another deflector in inoperative position.
Figure 3:
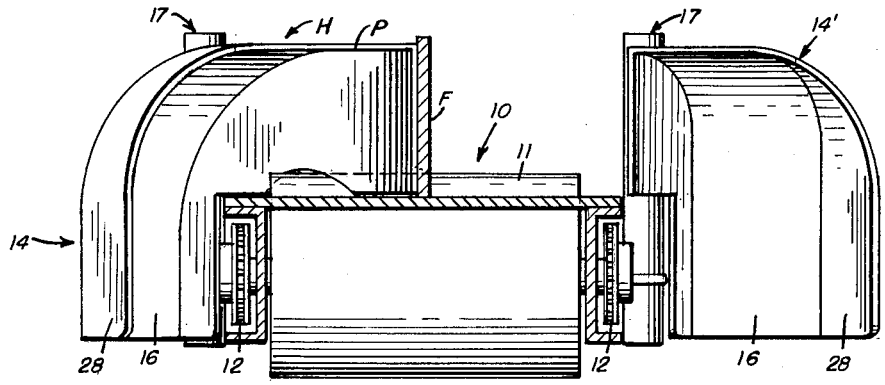
FIGURE 3 is a cross-sectional view taken along line 3—3 of FIGURE 2.
Figure 5:
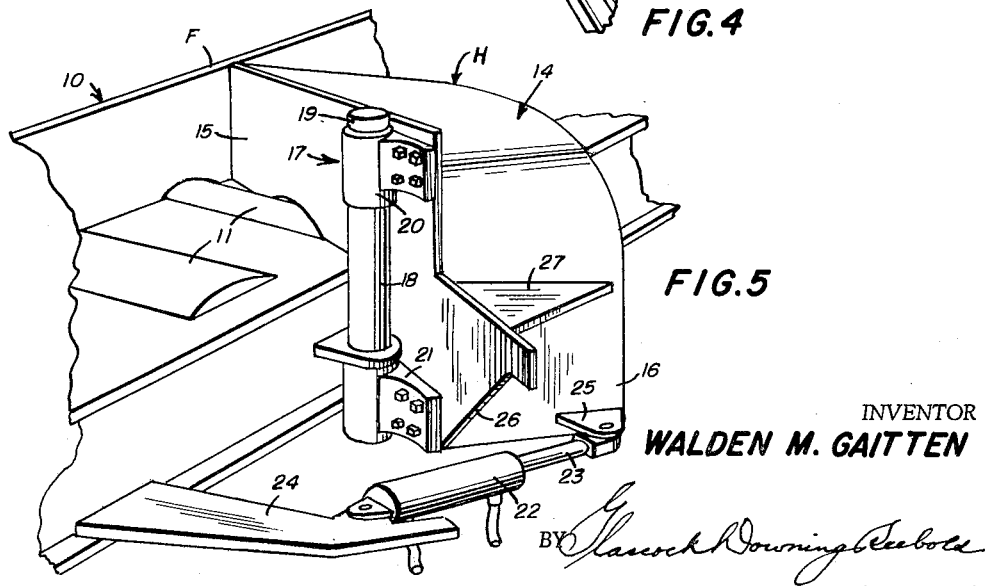
FIGURE 5 is a perspective view from the rear or outfeed side of the same deflector.

An extension 26 extends from plate 15, as seen in FIGURES 2 and 5, to accommodate a gusset plate 27 to reinforce plate 16 against the battering stress of the items being deflected. This stress will be considerable as the item must be decelerated from conveyor speed so each piece will fall with its leading end at substantially the same point.

A guard, and further strengthening plate 28, is secured to the edge of plate 16 remote from plate 15. This plate 28 extends downwards from the edge of the horizontal portion P of the plate 16 and is secured along the edge of plate 16 remote from plate 15 so that the structural relationship of vertical plate 15, plate 16 including the horizontal portion P and the downwardly curved portion 16a and plate 28 together define a hood-like structure H. Plate 28 is bowed as clearly shown in FIGURES 3 and 4, to provide clearance for items being deflected to be sure that plate 28 does not interfere with the action of the device.

It will be seen, then, that a deflector has been devised that may be selectively positioned in deflecting position or withdrawn from deflecting position so that the operator can divert elongated items from the conveyor where desired, and the diverted items will fall from the conveyor with their leading ends exactly located and with their lengths parallel to the conveyor from which they are diverted.

The specific device shown and described is an example of an embodiment of the invention and is not to be construed as limiting the following claims.

I claim:

1. A deflector means for deflecting elongated items travelling endwise along a conveyor having at least one longitudinal marginal edge to remove the items from the conveyor, said deflector comprising a vertical plate means adapted to extend entirely across the conveyor at an acute angle to the direction of travel of items therealong and adapted to be engaged by the leading end of an elongated item for forcing said leading end laterally to one side beyond the longitudinal edge of the conveyor, and second plate means carried by and extending generally normal to said vertical plate and including a surface overlying the conveyor lying in a horizontal plane and curving downwardly as it extends along the vertical plate means to a point outwardly beyond the longitudinal edge of the conveyor where said second plate means extends vertically downwardly below the longitudinal, marginal edge whereby the leading end of an elongated item deflected by said vertical plate means to one side beyond the longitudinal edge of the conveyor will be pushed downwardly by said curved surface relative to the conveyor so that the elongated item will slide off of the edge of the conveyor.

2. A deflector means as claimed in claim 1 and further including vertically extending pivot means interconnected between the side of said vertical plate means remote from said second plate means and a point adjacent to the longitudinal marginal edge of said conveyor whereby said deflector means can be moved from the position extending across the conveyor at an acute angle to the direction of travel of the items therealong and a position where said vertical plate means is disposed generally along said marginal edge of the conveyor to allow items to pass said deflector means and means for moving said deflector means between said positions.

3. The deflector means as claimed in claim 1 and a third plate means secured to the edge of said second plate means remote from the vertical plate means and depending downwardly from the portion of said second plate means that overlies the conveyor whereby all such plate means in interconnected relationship define a hood-like structure.

References Cited in the file of this patent

UNITED STATES PATENTS

| 2,718,959 | Van Otteren | Sept. 27, 1955 |
| 2,732,958 | Bonanno | Jan. 31, 1956 |
| 2,868,245 | Ernst | Jan. 13, 1959 |

FOREIGN PATENTS

| 668,003 | Great Britain | Mar. 12, 1952 |
| 818,060 | Great Britain | Aug. 12, 1959 |
| 942,912 | Germany | May 9, 1956 |